UNITED STATES PATENT OFFICE.

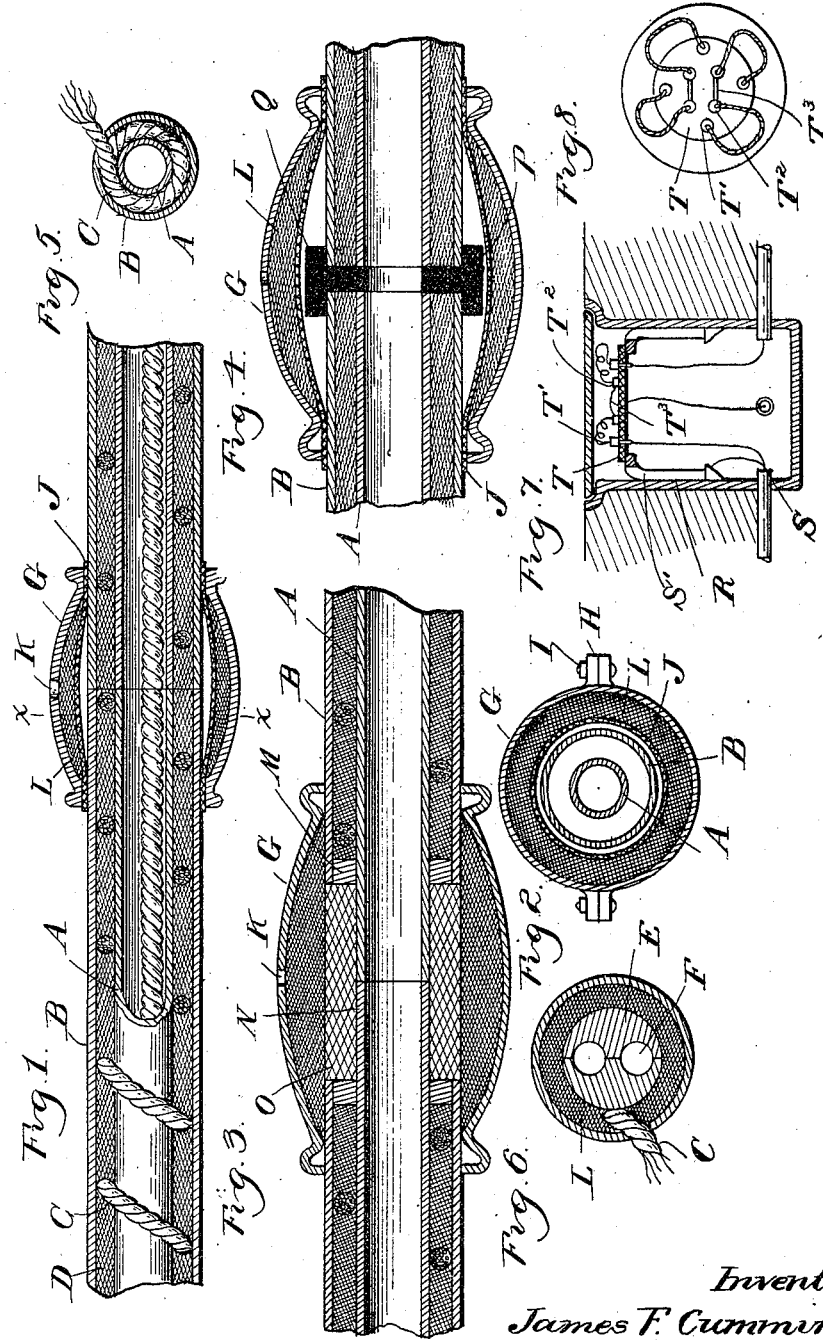

JAMES F. CUMMINGS, OF DETROIT, MICHIGAN.

UNDERGROUND CONDUIT FOR ELECTRICAL CONDUCTORS.

SPECIFICATION forming part of Letters Patent No. 497,536, dated May 16, 1893.

Application filed July 28, 1892. Serial No. 441,542. (No model.)

*To all whom it may concern:*

Be it known that I, JAMES F. CUMMINGS, a citizen of the United States, residing at Detroit, in the county of Wayne and State of Michigan, have invented certain new and useful Improvements in Underground Conduits for Electrical Conductors, of which the following is a specification, reference being had therein to the accompanying drawings.

This invention relates to new and useful improvements in underground conduits for electric conductors, and the invention consists in the peculiar construction of a conduit comprising an inner and an outer casing concentrically arranged with an insulating body between made in sections, and further in the peculiar construction of a joint between the sections, further in the peculiar construction of the man hole or service box, and further in the peculiar construction, arrangement and combination of the various parts.

The method of forming the conduit herein referred to, I have made the subject matter of a concurrently pending application filed July 12, 1892, Serial No. 439,748.

In the accompanying drawings Figure 1 is a vertical central, longitudinal section through the meeting ends of two sections of my conduit showing the inner casing partly in elevation. Fig. 2 is a cross section thereof on line x—x. Fig. 3 is a similar section to Fig. 1, showing a preferred form of joint or coupling. Fig. 4 is a similar section showing still another modification. Fig. 5 is an end elevation specifically referred to and illustrating the method of manufacturing the conduit. Fig. 6 is a cross section through a conduit showing the longitudinally divided interior casing. Fig. 7 is a vertical section through a man hole, and Fig. 8 is a plan view thereof, with the cover removed.

A and B are two casings preferably of metal piping forming the inner and outer casing of my conduit respectively.

Upon the casing A, I wind spirally a clamping means, such as rope or other suitable flexible non-conductor C, leaving a spiral space between the coils of the rope. The casing A thus wound is then inserted into the casing B, the rope or clamping means serving to keep the inner casing away from the outer casing forming an annular passage-way D from end to end between the coils of the rope. I then force into this annular space any suitable non-conducting material such as asphaltum, in liquid form, entirely filling this space. This filling is then allowed to harden and makes a rigid section of conduit as plainly shown in Fig. 1.

Instead of using an inner casing of iron piping, as shown in Fig. 1, I may use an inner casing as shown in Fig. 6, composed of two semi-cylindrical blocks E, preferably of wood having corresponding grooves F forming passage ways therethrough, and in such construction I place the two blocks together to form a cylinder, and then wind it with a rope, or clamping means place it within the outer casing, and then fill the annular space between the two in the same manner as before described. These sections may be joined together in various ways depending largely upon the kind of conductor which it is designed to carry through them. For high tension electric currents I preferably use the construction shown in Figs. 1 and 3, and for telephone or telegraph work I use the construction shown in Fig. 4.

The coupling shown in Fig. 1, consists of a clamping sleeve G made in two halves with clamping lugs H on the sides tightly clamped upon the meeting ends of the sections by means of clamping bolts I. J is a flexible sleeve preferably of rubber which is placed over the joint within the coupling G and clamped in position. The coupling is provided with a suitable aperture K through which an insulating compound may be poured into the annular chamber formed between the coupling and sleeve J as shown at L in Figs. 1 and 4. The rubber J is used to make a tight joint between the outer tube and coupling sleeves and to prevent the filling material in the sleeve from adhering to the tube which would greatly interfere with the disunion of the section.

Instead of using the packing sleeve J, other forms of packing may be employed, as for instance that shown in Fig. 3, where I show a plug M for the annular space between the two casings at the ends thereof, and have shown the inner casing provided with an extension N beyond the end of the outer casing; the ends of the inner casing are abutted leaving an annular space between the ends of the outer casing in which I place a suitable insulating ring O of rubber or other material. This ring O serves in a measure the purpose of the packing J, of the form described. Around the end of the sections I clamp the two part coupling G and fill in the space within the coupling as previously described. If desired, for telephone or telegraph conduits, each section of coupling may be insulated from the other, and this may be accomplished in any desired manner. I preferably accomplish it by placing an insulating ring P between the meeting ends of the sections; this ring having suitable lateral flanges Q on each side overlapping the ends of the outer casing. The packing sleeve J and filling L outside of this ring prevent possibility of contact from one section to the other through the medium of the coupling.

In Figs. 7 and 8, I have shown my improved man-hole or service box consisting of an open top metallic casing R having inwardly extending lugs S upon which rests a detachable frame S' extending to near the top of the casing R, and upon this frame is placed a plate T having formed thereon an outer series of contacts T', and an inner series of contacts T². The conductor is brought in through the conduit which extends inside of the box and is connected to one of the outer series of contacts T' and thence to one of the inner contacts, the two inner contacts being connected by a fuse T³, thence to one of the outer contacts down through the box to the conduit through which it is desired to be carried. This arrangement of the contacts enables me to arrange the fuse wires in easy position for replacing in case they are burned out, and enables me to make a crossing or to turn a corner without difficulty, and also result in a construction of man hole which is easily manufactured, assembled or repaired.

What I claim as my invention is—

1. In an electrical conduit for electrical conductors, the combination of an inner conduit made in longitudinally divided sections, of clamping means upon the sections for holding the parts together, an outer casing surrounding the inner casing, the clamping means forming spacing means to separate the two to leave a continuous inner chamber, and a non-conductor insulating compound in said chamber, substantially as described.

2. In an underground conduit for electrical conductors, the combination of the inner casing divided longitudinally into sections, of a flexible cord wound spirally about the same and serving to clamp the sections together, an outer casing surrounding said sectional casing, said cord serving to separate the inner casing from the outer casing and form a continuous spiral chamber from end to end thereof, and a non-conducting insulating compound filled in said chamber, substantially as described.

3. In an underground conduit for electrical conductors, the combination with inner conduits, of outer conduits shorter than the inner conduits, clamping means between the outer and inner conduits, plugs at the ends of the outer conduit, insulating material between the adjacent plugs and on the inner conduits, and clamping sleeves over the ends of the conduits and insulating material, substantially as described.

4. In an electrical conduit, the combination with inner conduits, of outer conduits, spiral spacing means between the conduits, rubber insulating strips at the junction of adjacent conduits, clamping sleeves G over the insulating strips and a filling of insulating material between the sleeves and strips, substantially as described.

In testimony whereof I affix my signature in presence of two witnesses.

JAMES F. CUMMINGS.

Witnesses:
M. B. O'DOGHERTY,
N. L. LINDOP.